US012791063B2

(12) United States Patent
Miyazaki et al.

(10) Patent No.: US 12,791,063 B2
(45) Date of Patent: Nov. 10, 2026

(54) INDUSTRIAL MACHINE

(71) Applicant: FANUC CORPORATION, Yamanashi (JP)

(72) Inventors: Genki Miyazaki, Yamanashi (JP); Yoshihiro Tanno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 225 days.

(21) Appl. No.: 18/833,286

(22) PCT Filed: Feb. 28, 2022

(86) PCT No.: PCT/JP2022/008251
§ 371 (c)(1),
(2) Date: Jul. 25, 2024

(87) PCT Pub. No.: WO2023/162215
PCT Pub. Date: Aug. 31, 2023

(65) Prior Publication Data

US 2025/0154988 A1 May 15, 2025

(51) Int. Cl.
*F16D 1/076* (2006.01)
*B23P 19/02* (2006.01)
*F16B 5/02* (2006.01)

(52) U.S. Cl.
CPC ............ *F16D 1/076* (2013.01); *B23P 19/025* (2013.01); *F16B 5/02* (2013.01); *Y10S 901/28* (2013.01); *Y10T 29/49815* (2015.01)

(58) Field of Classification Search
CPC .......... F16D 1/076; B23P 19/025; F16B 5/02; Y10S 901/28; Y10T 29/49815
(Continued)

(56) References Cited

U.S. PATENT DOCUMENTS 441,170 A * 11/1890 Kidder .................... F16H 55/40 403/16
2,849,886 A * 9/1958 Mccloskey ........... F16H 55/566
(Continued)

FOREIGN PATENT DOCUMENTS

JP S5983105 U 6/1984
JP S6416380 A 1/1989
(Continued)

OTHER PUBLICATIONS

International Search Report dated May 17, 2022, for International Patent Application No. PCT/JP2022/008251.

*Primary Examiner* — Greg Binda
(74) *Attorney, Agent, or Firm* — KARCESKI IP LAW, PLLC

(57) ABSTRACT

An industrial machine includes: a machine part having a machining surface; and a shaft. The machining surface is provided with: a fitting hole orthogonal to the machining surface and into which the shaft is fitted; a plurality of screw holes formed around the fitting hole at intervals in a circumferential direction; and a recess disposed between any of the screw holes adjacent in the circumferential direction. The shaft is provided with a flange in contact with the machining surface where the shaft fits into the fitting hole. The flange is provided with: a plurality of through-holes through which bolts can pass; and a removal tap hole that can be disposed at a position corresponding to the recess when the shaft fits into the fitting hole. The recess is formed in a region that does not overlap regions equal to an outer diameter of heads of the bolts.

4 Claims, 6 Drawing Sheets

(58) Field of Classification Search
USPC .......................................................... 403/16
See application file for complete search history.

(56) References Cited

U.S. PATENT DOCUMENTS

| | | | | |
|---|---|---|---|---|
| 3,957,381 | A * | 5/1976 | Schafer | F16D 1/093 403/16 |
| 4,304,502 | A * | 12/1981 | Stratienko | F16D 1/094 |
| 7,309,187 | B2 * | 12/2007 | Swanson | F16D 1/094 |

FOREIGN PATENT DOCUMENTS

| | | | |
|---|---|---|---|
| JP | H0398332 | U | 10/1991 |
| JP | H1171990 | A | 3/1999 |
| JP | 2003305665 | A | 10/2003 |
| JP | 2004092115 | A | 3/2004 |
| JP | 2005201122 | A | 7/2005 |
| JP | 2013126297 | A | 6/2013 |
| JP | 2015128969 | A | 7/2015 |
| WO | 2017187572 | A1 | 11/2017 |

* cited by examiner

INDUSTRIAL MACHINE

CROSS-REFERENCE TO RELATED APPLICATION(S)

This is a National Stage Entry into the United States Patent and Trademark Office from International Patent Application No. PCT/JP2022/008251, filed on Feb. 28, 2022, the entire content of which is incorporated herein by reference.

FIELD OF THE INVENTION

The present invention relates to an industrial machine.

BACKGROUND OF THE INVENTION

In a known structure in which a shaft component is fitted into a hole, a removal tap hole provided in a flange of the shaft component is used when the shaft component is to be removed from the hole for maintenance or the like (for example, see Japanese Unexamined Patent Application, Publication No. Sho 59-83105).

When a burr is generated on a machining surface against which the distal end of a removal bolt fastened to the removal tap hole is pressed, the burr becomes an obstacle when the shaft component is assembled again, and the task of removing the burr is also troublesome. By providing a relief recess in the machining surface of the portion against which the distal end of the removal bolt abuts, it is possible to prevent the burr from hindering close contact between the shaft component and the machining surface of the flange.

SUMMARY OF INVENTION

One embodiment of the present invention is an industrial machine including: a machine part having a machining surface; and a shaft. The machining surface is provided with: a fitting hole orthogonal to the machining surface and into which the shaft is fitted; a plurality of screw holes formed around the fitting hole at intervals in a circumferential direction; and a recess disposed between any of the screw holes adjacent in the circumferential direction. The shaft is provided with a flange to be brought into close contact with the machining surface in a state in which the shaft is fitted into the fitting hole. The flange is provided with: a plurality of through-holes through which bolts to be fastened to the screw holes can pass; and a removal tap hole that can be disposed at a position corresponding to the recess in a state in which the shaft is fitted into the fitting hole. The recess is formed in a region that does not overlap regions equal to an outer diameter of heads of the bolts around the screw holes disposed on both sides of the recess in the circumferential direction.

DESCRIPTION OF EMBODIMENT(S) OF THE INVENTION

An industrial machine 1 according to an embodiment of the present invention will be described below with reference to the drawings.

Figure 1:
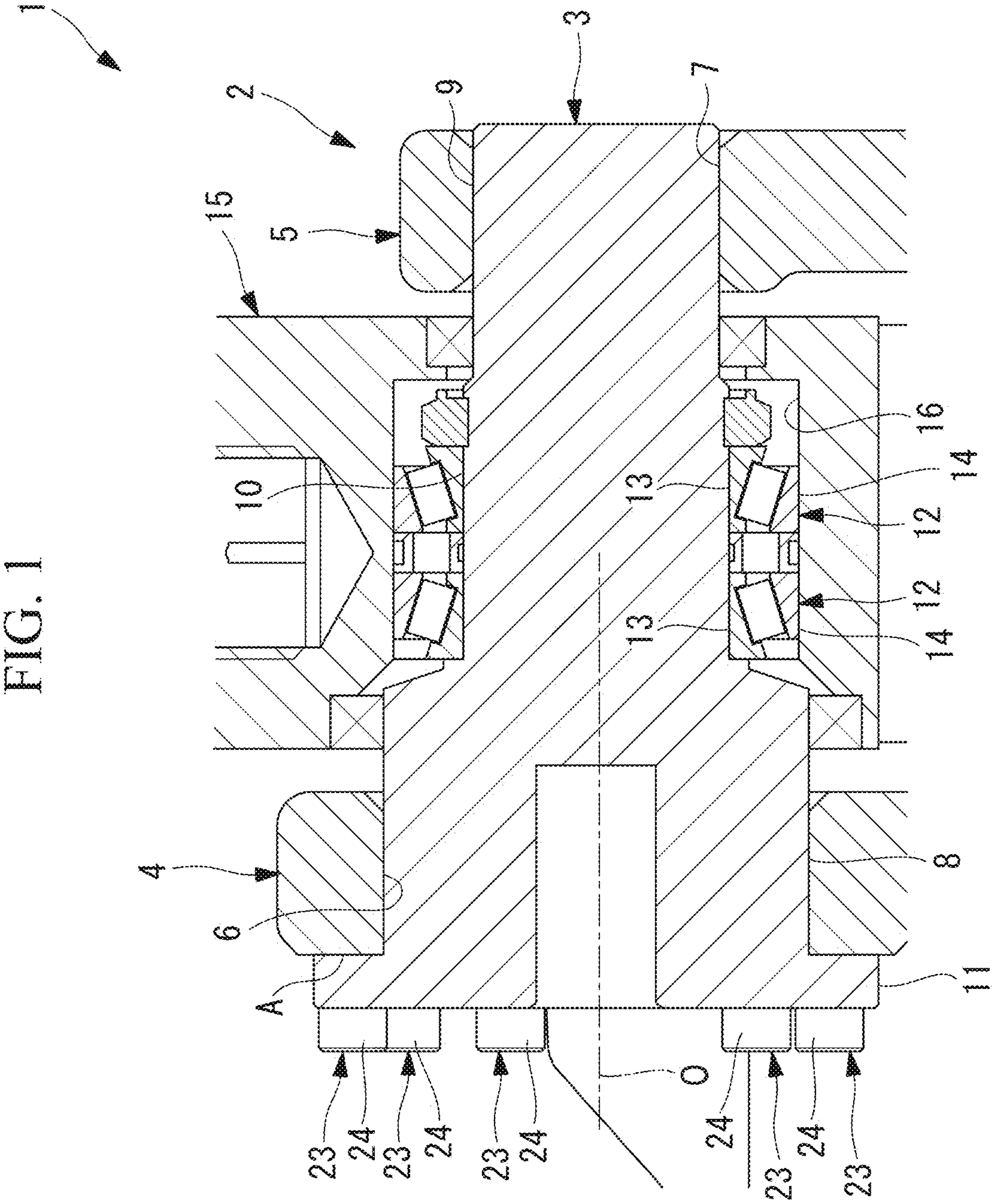
FIG. 1 is a vertical cross-section partially showing an industrial machine according to an embodiment of the present invention.

The industrial machine 1 according to this embodiment is, for example, a robot, and includes a housing (machine part) 2 and a shaft 3 that couples a link member 15 to the housing 2 so as to be rotatable about a horizontal axis, as shown in FIG. 1.

The housing 2 includes a first plate-like part 4 and a second plate-like part 5 formed in parallel flat plate shapes. In a state in which the industrial machine 1 is installed on an installation surface, such as a horizontal floor surface, the first plate-like part 4 and the second plate-like part 5 are disposed so as to extend in the vertical direction.

A machining surface A, which is a flat surface extending in the vertical direction, is provided on the outer surface of the first plate-like part 4. The first plate-like part 4 is provided with a first fitting hole (fitting hole) 6 extending from the machining surface A in a direction orthogonal to the machining surface A. The second plate-like part 5 is provided with a second fitting hole 7 disposed coaxially with the first fitting hole 6 and having a smaller inner diameter than the first fitting hole 6.

The shaft 3 includes a large-diameter portion 8 fitted into the first fitting hole 6, and a small-diameter portion 9 fitted into the second fitting hole 7 when the shaft 3 is inserted into the first fitting hole 6 in the horizontal direction from the machining surface A side of the first plate-like part 4. The shaft 3 further includes an intermediate portion 10 disposed between the large-diameter portion 8 and the small-diameter portion 9, and a flange 11 adjacent to the large-diameter portion 8. The intermediate portion 10 is fitted in inner rings 13 of bearings 12, and outer rings 14 of the bearings 12 are fitted in a hole 16 provided at one end of the link member 15.

With this structure, the shaft 3 is supported between the first plate-like part 4 and the second plate-like part 5 like a doubly supported beam, and the link member 15 is supported by the shaft 3 so as to be rotatable about the horizontal axis, which is a center axis O of the shaft 3.

Figure 2:
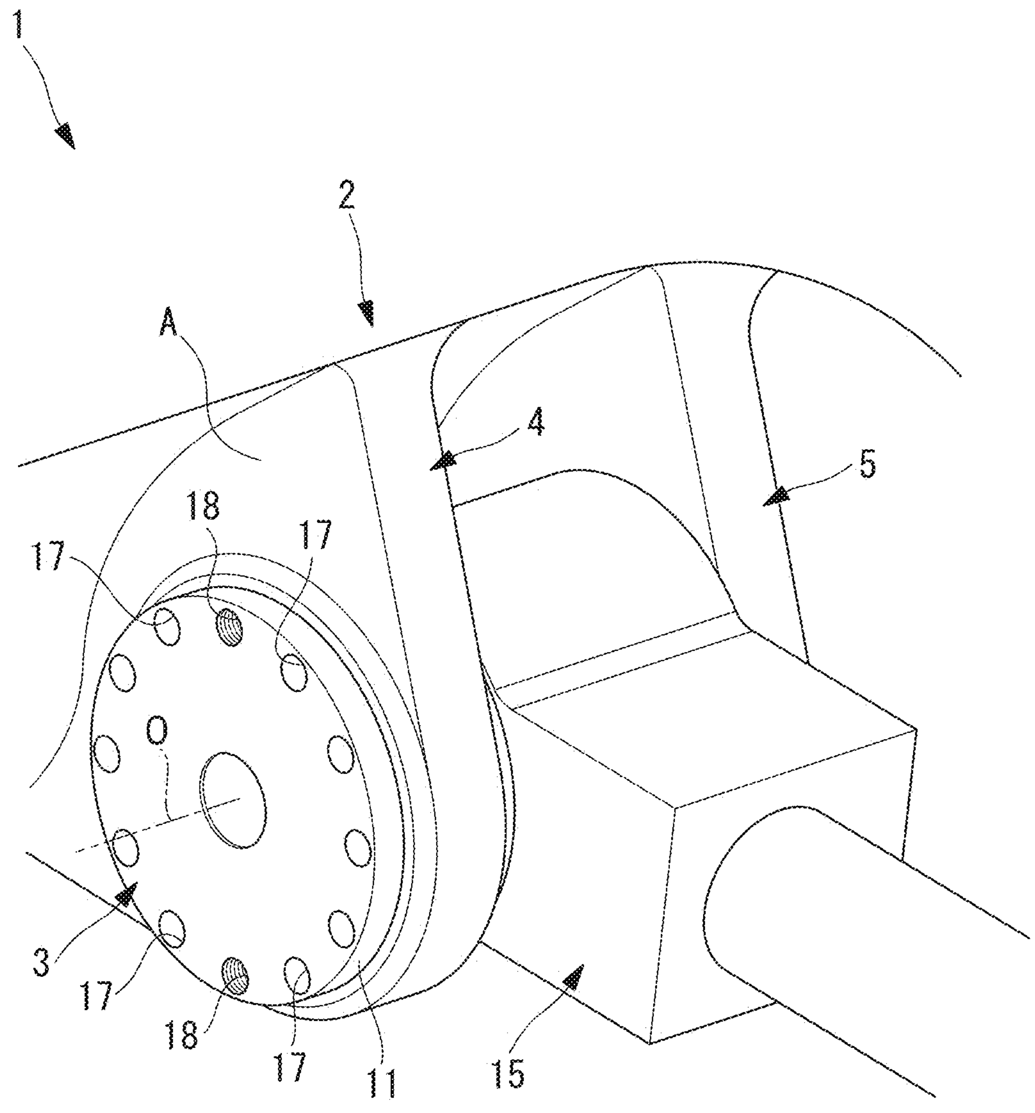
FIG. 2 is a perspective view showing a part of the industrial machine in FIG. 1.

The flange 11 is formed in the shape of a disk provided in a flange shape at one end of the large-diameter portion 8, and, as shown in FIG. 2, has a plurality of through-holes 17 provided at equal intervals in the circumferential direction about the center axis O of the shaft 3.

The flange 11 is also provided with two removal tap holes 18 at positions 180° apart from each other about the center axis O of the shaft 3. The removal tap holes 18 are disposed between two through-holes 17 adjacent in the circumferential direction, at the same positions in the radial direction with respect to the center axis O of the shaft 3.

Figure 3:
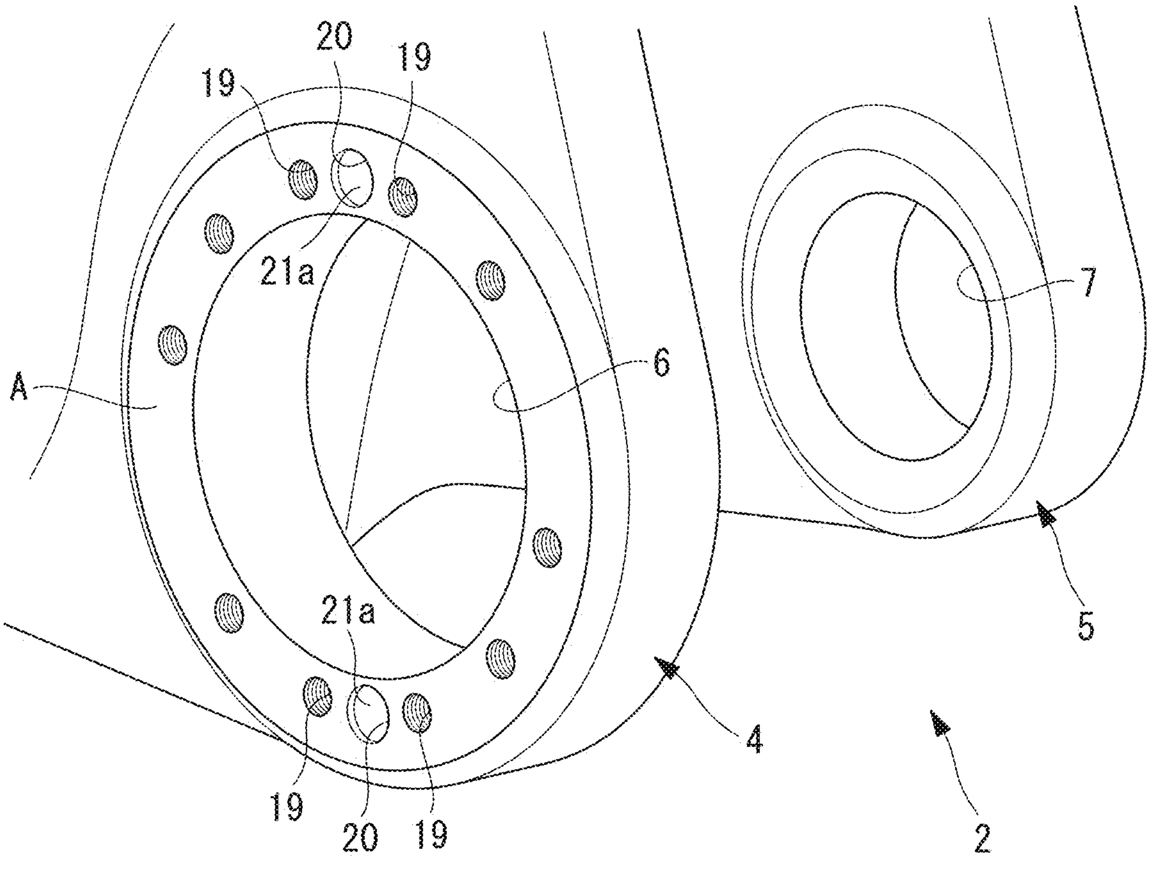
FIG. 3 is a perspective view showing a machining surface of a housing of the industrial machine in FIG. 2.

Meanwhile, as shown in FIG. 3, the machining surface A is provided with a plurality of screw holes 19 arranged at intervals in the circumferential direction, radially outward of the first fitting hole 6. Furthermore, the machining surface A is provided with two recesses 20 at positions spaced apart by 180° about the center axis of the first fitting hole 6 and disposed vertically across the horizontal line, for example, at positions vertically above and vertically below the first fitting hole 6. Each of the recesses 20 has a bottom surface 21*a* disposed at a position lower than the machining surface A.

The radius of a circle connecting the centers of the screw holes 19 in the machining surface A is the same as the radius of a circle connecting the centers of the through-holes 17 in the flange 11. The distance from the center axis of the first fitting hole 6 to the recesses 20 in the machining surface A is the same as the distance from the center axis O of the shaft 3 to the removal tap holes 18.

Figure 4:
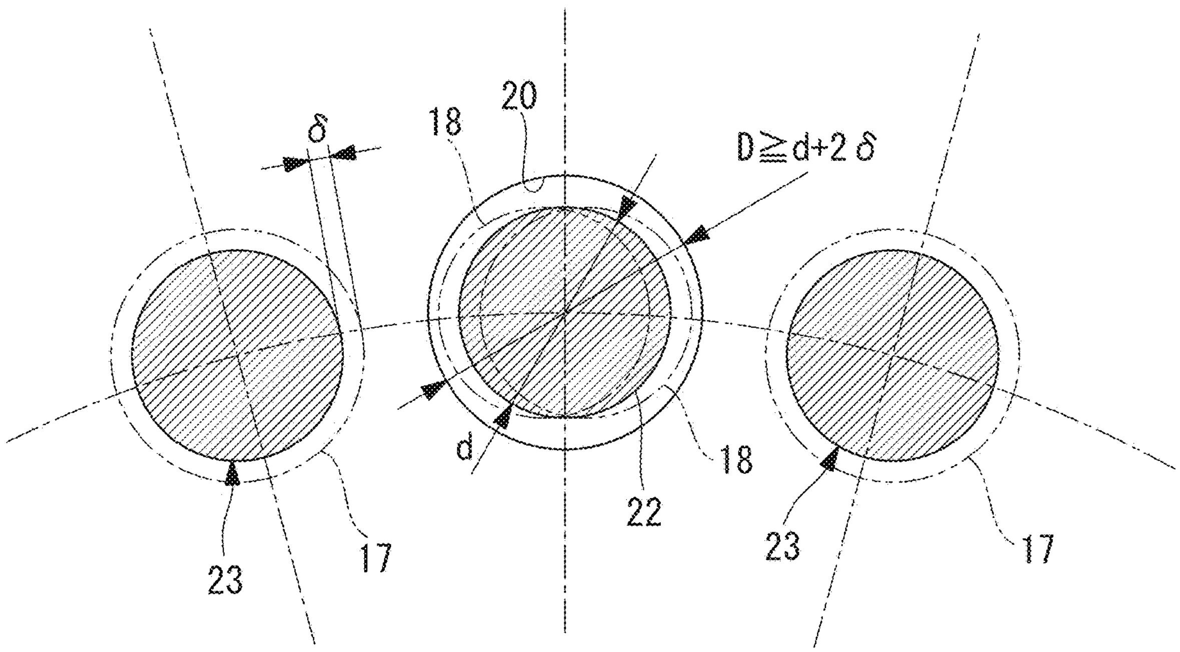
FIG. 4 is a partial front view for explaining recesses formed in the machining surface in FIG. 2.

In this embodiment, as shown in FIG. 4, each of the recesses 20 is formed in a circular shape having a diameter D, which is larger than the dimension obtained by adding a gap 8 between the through-hole 17 and a fixing bolt (bolt) 23 in the radial direction to an outer diameter d of the distal end of a removal bolt 22 fastened to the removal tap hole 18 in the flange 11. More specifically, the relationship of $D \geq d+2\delta$ is satisfied.

Figure 5:
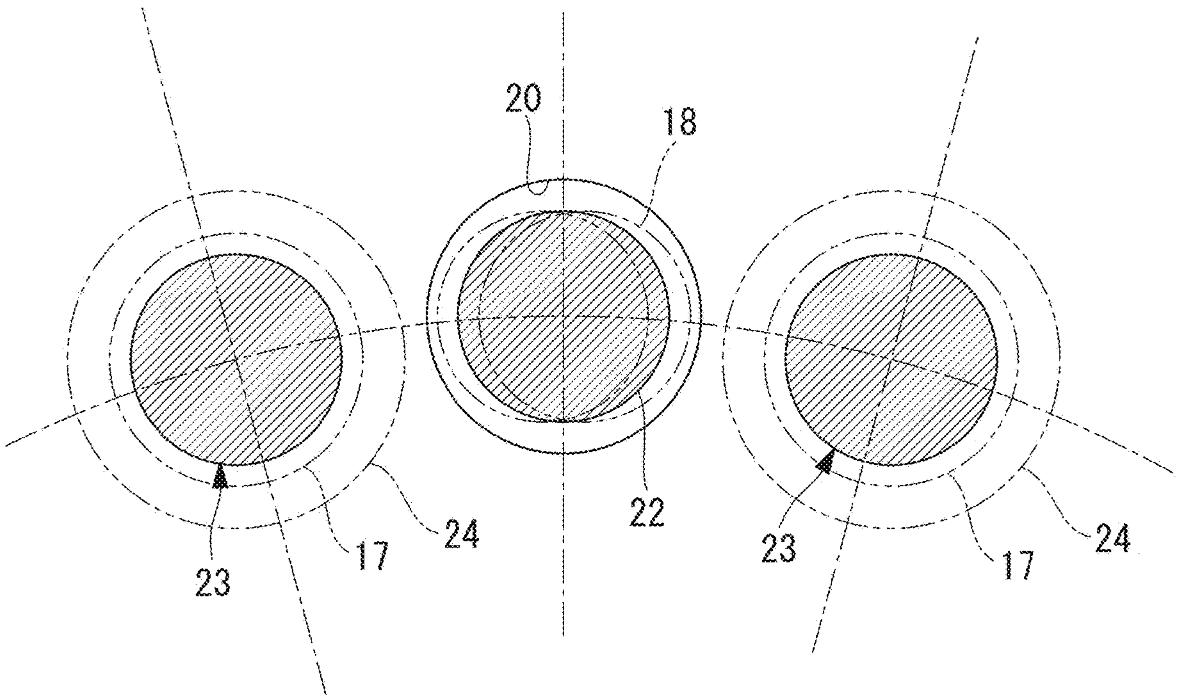
FIG. 5 is a partial front view showing the relationship between the recesses formed in the machining surface in FIG. 2 and fixing bolts for fixing a flange.

As shown in FIG. 5, each of the recesses 20 is formed in a region that does not overlap regions around two screw holes 19 adjacent thereto on both sides in the circumferential direction, the regions being circular regions having the same outer diameter as heads 24 of the fixing bolts 23 fastened to the screw holes 19.

The operation of the thus-configured industrial machine 1 according to this embodiment will be described below.

According to the industrial machine 1 of this embodiment, in order to assemble the shaft 3 with respect to the housing 2, the shaft 3 is inserted into the first fitting hole 6 in the horizontal direction from the machining surface A side of the first plate-like part 4, in a state in which the bearings 12 are fitted to the intermediate portion 10 of the shaft 3. In this way, the small-diameter portion 9, the intermediate portion 10, and the bearings 12 assembled with respect to the intermediate portion 10 are passed through the first fitting hole 6. Then, the small-diameter portion 9 is fitted into the second fitting hole 7 of the second plate-like part 5, the outer rings 14 of the bearings 12 are fitted into the hole 16 in the link member 15, and the large-diameter portion 8 is fitted into the first fitting hole 6 in the first plate-like part 4.

When the large-diameter portion 8 of the shaft 3 is fitted into the first fitting hole 6 and the small-diameter portion 9 of the shaft 3 is fitted into the second fitting hole 7 to bring the flange 11 into close contact with the machining surface A, the attaching phase of the shaft 3 about the center axis O is adjusted. By doing so, the through-holes 17 in the flange 11 can be disposed at positions facing the screw holes 19 in the machining surface A, and the removal tap holes 18 can be disposed at positions facing the recesses 20.

Thereafter, in a state in which the flange 11 is in close contact with the machining surface A, the fixing bolts 23 passed through the through-holes 17 are fastened to the screw holes 19 in the machining surface A. By doing so, the shaft 3 is fixed between the two plate-like parts 4 and 5 of the housing 2 like a doubly supported beam, and the link member 15 can be supported so as to be rotatable about the center axis O of the shaft 3 relative to the housing 2.

In this case, because the area of the machining surface A with which the flange 11 is in close contact is reduced by the recesses 20, the friction between the flange 11 and the machining surface A at these portions is not obtained. The regions where the flange 11 and the machining surface A are brought into contact with each other with high pressure by the fixing bolts 23 fastened to the screw holes 19 in the machining surface A are regions equal to the outer diameter 24 of the heads of the fixing bolts 23 around the screw holes 19.

In this embodiment, by forming the recesses 20 so as not to overlap the regions where the flange 11 and the machining surface A are brought into close contact with each other with high pressure, it is possible to prevent a significant decrease in the frictional force between the flange 11 and the machining surface A.

As a result, there is an advantage in that it is possible to prevent the shaft 3 and the housing 2 from relatively moving about the center axis O of the shaft 3 due to lack of frictional force.

Figure 6:
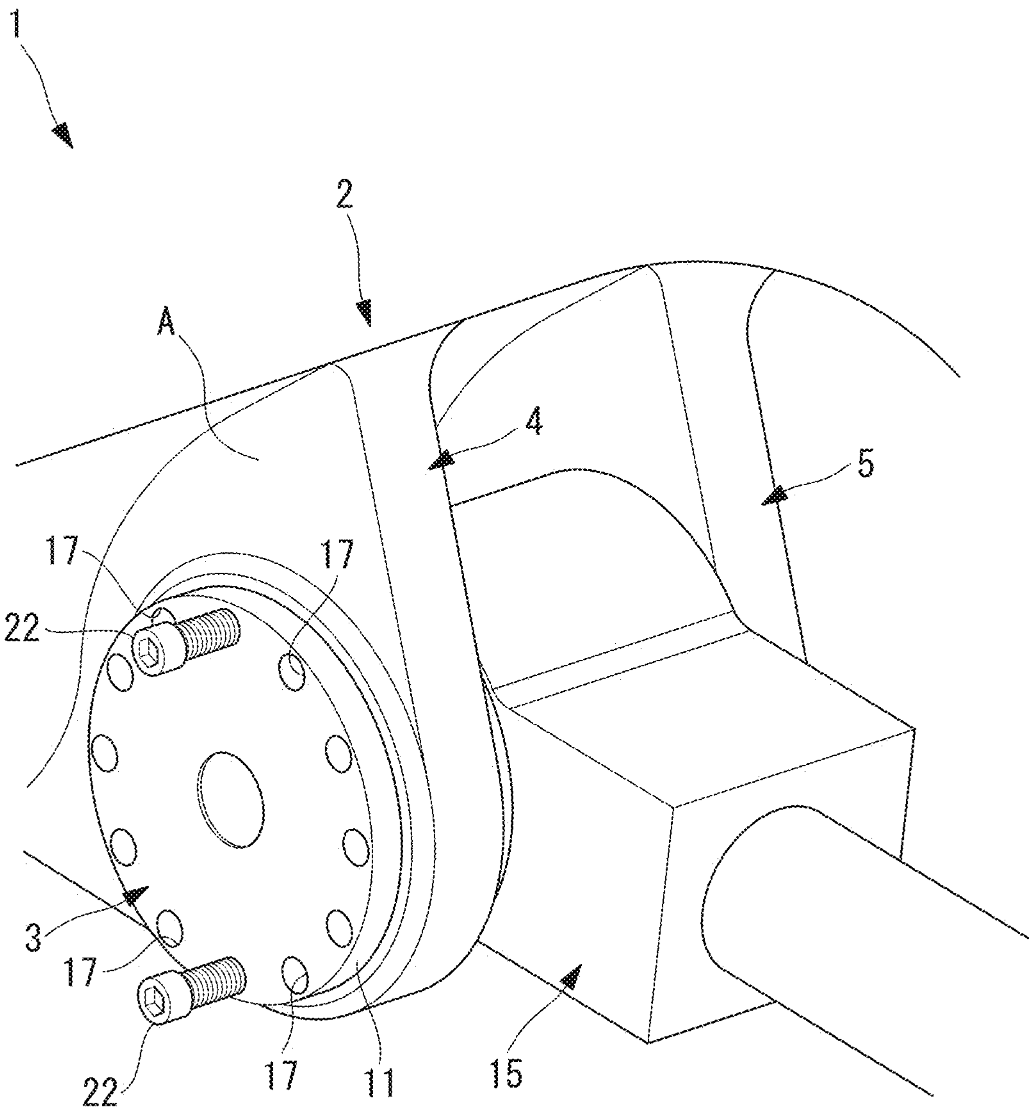
FIG. 6 is a perspective view showing a state in which removal bolts are fastened to removal tap holes formed in the flange in FIG. 2.
Figure 7:
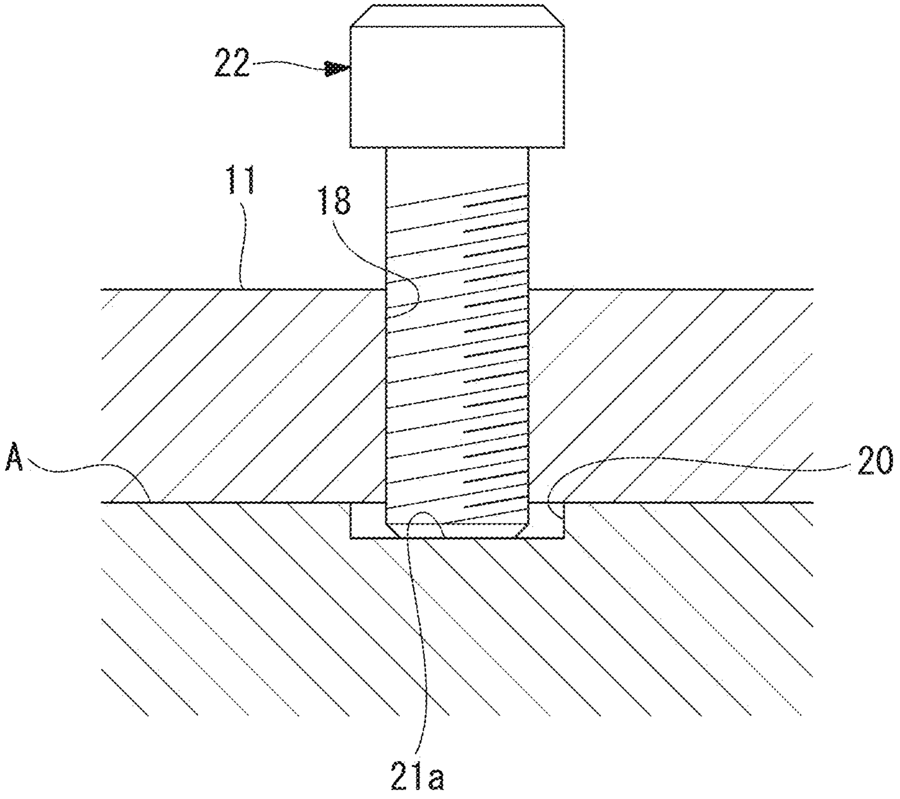
FIG. 7 is a vertical cross-section showing the relationship between the removal bolt and the recess in FIG. 6.

Meanwhile, when the shaft 3 is removed from the housing 2, as shown in FIG. 6, all the fixing bolts 23 are removed. Then, the removal bolts 22 are fastened to the removal tap holes 18 in the flange 11 to press the bottom surfaces 21*a* of the recesses 20 with the distal ends of the removal bolts 22, as shown in FIG. 7. By doing so, a force in the direction away from the machining surface A acts on the flange 11, allowing the shaft 3 to be easily removed from the first fitting hole 6 and the second fitting hole 7.

In this case, as described above, because the removal bolts 22 press the bottom surfaces 21*a* of the recesses 20 while being in contact therewith and rotating, the bottom surfaces 21*a* of the recesses 20 are roughened, and burrs may be generated. Because the bottom surfaces 21*a* of the recesses 20 are disposed at positions lower than the machining surface A, the burrs do not protrude outside the machining surface A and thus do not hinder close contact between the flange 11 and the machining surface A in the next assembly. Furthermore, because the task of removing the generated burrs is unnecessary, re-assembly can be easily performed.

Even when the fixing bolts 23 are correctly positioned with respect to the screw holes 19 in the machining surface A, because there are gaps between the fixing bolts 23 and the through-holes 17 through which the fixing bolts 23 pass, the flange 11 may be shifted with respect to the machining surface A in the circumferential direction by an amount corresponding to the gaps. Because the recesses 20 are formed in a circular shape having a diameter larger than the dimension obtained by adding the gap between the through-hole 17 and the fixing bolt 23 in the radial direction to the diameter of the distal end of the removal bolt 22 fastened to the removal tap hole 18, the end faces of the removal bolts 22 can be disposed in the recesses 20 even if the flange 11 is shifted in the circumferential direction.

Accordingly, even if the flange 11 is shifted by an amount corresponding to the gaps with respect to the housing 2, it is possible to prevent an inconvenience that the machining surface A is roughened by the distal ends of the removal bolts 22 fastened to the removal tap holes 18.

In the task of removing the shaft 3, when a removal bolt 22 is gradually fastened to one removal tap hole 18, an offset load is applied to the flange 11, tilting the large-diameter portion 8 of the shaft 3 with respect to the first fitting hole 6. When the tilt angle increases, galling occurs between the large-diameter portion 8 and the first fitting hole 6, which makes it difficult to remove the shaft 3 from the first fitting hole 6.

In this embodiment, because the removal tap holes 18 are disposed on the opposite sides of the center axis O of the shaft 3, the shaft 3 can be removed from the first fitting hole 6 without galling by alternately fastening the two removal bolts 22 little by little.

In particular, when the shaft 3 is disposed in the horizontal direction as in this embodiment, a moment about the horizontal axis acts on the shaft 3 due to its own weight at the time of removing the shaft 3.

Also in this case, because the recesses 20 are disposed at two vertical positions, i.e., above and below the first fitting hole 6, it is possible to apply, to the shaft 3, a moment in the opposite direction about the horizontal axis by fastening the removal bolts 22. Hence, even if galling due to its own weight occurs, it is possible to correct the galling and to easily remove the shaft 3.

In this embodiment, when the shaft 3 is removed halfway, and the small-diameter portion 9 is disengaged from the second fitting hole 7, an upward or downward load may be applied to the intermediate portion 10 due to the weight of the link member 15 or a member connected to the link member 15. Also in this case, a moment about the horizontal axis is generated in the shaft 3. However, a moment in the opposite direction is applied by the removal bolts 22 at positions above and below the large-diameter portion 8, it is possible to correct galling and to easily remove the shaft 3, which is advantageous.

Figure 8:
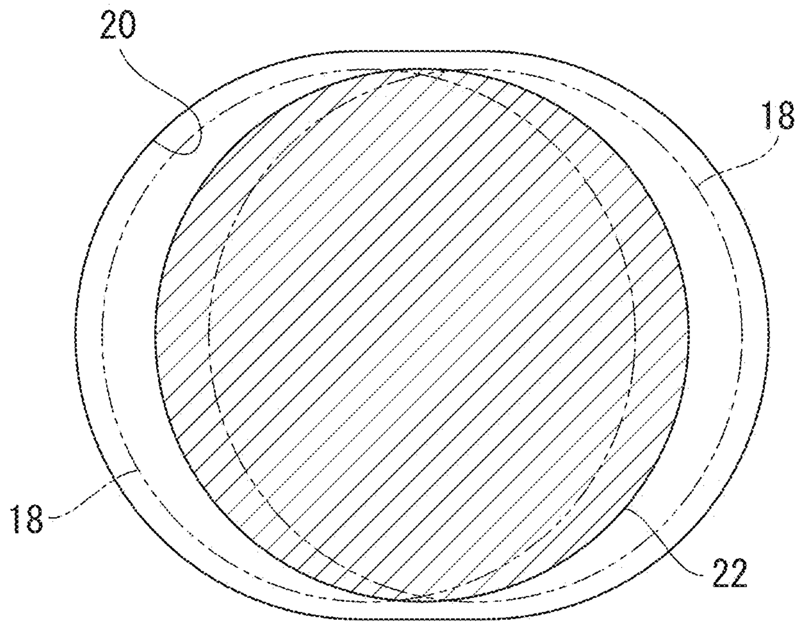
FIG. 8 is a diagram showing a modification of the recess in FIG. 3.

In this embodiment, the recesses 20 are formed in a circular shape having a diameter larger than the dimension obtained by adding the gap between the through-hole 17 and the fixing bolt 23 in the radial direction to the outer diameter of the distal end of the removal bolt 22. However, the structure is not limited thereto. Specifically, even if the flange 11 is shifted by an amount corresponding to gaps between the through-holes 17 and the fixing bolts 23 in the radial direction, it is only necessary that the distal ends of the removal bolts 22 are disposed in the recesses 20. Thus, the recesses 20 may be formed in an oval shape extending in the circumferential direction, as shown in FIG. 8.

In that case, the width in the radial direction with respect to the center of the first fitting hole 6 is slightly larger than the diameter of the distal ends of the removal bolts 22. This reduces the decrease in the contact area between the flange 11 and the machining surface A due to the recesses 20, enabling a larger frictional force to be generated between the flange 11 and the machining surface A.

In this embodiment, the recesses 20 are provided at two positions, i.e., vertically above and vertically below the first fitting hole 6. However, the positions are not limited thereto. As long as the recesses 20 are provided above and below the horizontal line passing through the center axis of the first fitting hole 6 and are located on the machining surface A, the recesses 20 may be shifted from the positions vertically above and vertically below the first fitting hole 6.

Furthermore, the housing 2 may be provided with indicators that can indicate the positions of the recesses 20 in a state in which the flange 11 is in close contact with the machining surface A.

The indicators may be provided on the machining surface A by, for example, providing marks on the bottom surfaces 21*a* of the recesses 20 or painting only the bottom surfaces 21*a* of the recesses 20 with a color.

By doing so, even in a state in which the flange 11 is in close contact with the machining surface A, it is possible to view the indicators through the removal tap holes 18 and to prevent the removal bolts 22 from pressing the machining surface A other than the recesses 20. The indicators may be marks, such as arrows, that are disposed radially outward of the flange 11 in close contact with the machining surface A and that indicate the positions of the recesses 20.

In this embodiment, the housing 2 has been described as an example of the machine part, and the shaft 3 has been described as an example of a member for rotatably attaching the link member 15 to the housing 2. However, it is not limited thereto and may be applied to any other machine parts of the industrial machine 1. Furthermore, although the robot has been described as an example of the industrial machine 1, it may be applied to any other industrial machine instead of the robot.

The invention claimed is:

1. An industrial machine comprising:

a machine part having a machining surface; and a shaft, wherein the machining surface is provided with: a fitting hole orthogonal to the machining surface and into which the shaft is fitted; a plurality of screw holes formed around the fitting hole at intervals in a circumferential direction; and a recess disposed between any of the screw holes adjacent in the circumferential direction, the shaft is provided with a flange to be brought into close contact with the machining surface in a state in which the shaft is fitted into the fitting hole, the flange is provided with: a plurality of through-holes through which bolts to be fastened to the screw holes can pass; and a removal tap hole that can be disposed at a position corresponding to the recess in a state in which the shaft is fitted into the fitting hole, the recess is formed in a region that does not overlap regions equal to an outer diameter of heads of the bolts around the screw holes disposed on both sides of the recess in the circumferential direction, and the recess has a circular shape having a diameter larger than a dimension obtained by adding, to a diameter of a distal end of a removal bolt to be fastened to the removal tap hole, a gap in a radial direction between the through-holes and the bolts.

2. The industrial machine according to claim 1, wherein the recess is provided on each side of a center axis of the fitting hole.

3. An industrial machine comprising:

a machine part having a machining surface; and a shaft, wherein the machining surface is provided with: a fitting hole orthogonal to the machining surface and into which the shaft is fitted; a plurality of screw holes formed around the fitting hole at intervals in a circumferential direction; and a recess disposed between any of the screw holes adjacent in the circumferential direction, the shaft is provided with a flange to be brought into close contact with the machining surface in a state in which the shaft is fitted into the fitting hole, the flange is provided with: a plurality of through-holes through which bolts to be fastened to the screw holes can pass; and a removal tap hole that can be disposed at a position corresponding to the recess in a state in which the shaft is fitted into the fitting hole, the recess is formed in a region that does not overlap regions equal to an outer diameter of heads of the bolts around the screw holes disposed on both sides of the recess in the circumferential direction, and the recess has an oval shape having a length larger than a dimension obtained by adding, to a diameter of a distal end of a removal bolt to be fastened to the removal tap hole, a gap in a radial direction between the through-holes and the bolts and a width larger than the diameter of the distal end.

4. The industrial machine according to claim 3, wherein the recess is provided on each side of a center axis of the fitting hole.

* * * * *